United States Patent Office 3,232,831
Patented Feb. 1, 1966

3,232,831
STABILIZED PESTICIDAL COMPOSITIONS CONTAINING ATTAPULGITE CLAY
Ira A. Schwint, Metuchen, N.J., assignor to Minerals & Chemicals Philipp Corporation, Menlo Park, N.J., a corporation of Maryland
No Drawing. Filed Nov. 7, 1962, Ser. No. 236,138
6 Claims. (Cl. 167—42)

This invention relates to improvements in solid pesticide compositions and relates, especially, to improving the heat and storage stability of solid pesticide formulations in which attapulgite clay is used as the carrier for an active organic toxicant material.

To permit effective application of many pesticides by airborne or ground spreading equipment, the active pesticide is impregnated on a solid carrier material which may be diluted to field strength prior to application. The physical properties of the solid formulation, such as ease of flow and retention on the plant, are of the essence. Clays are frequently preferred as the carrier material because of the desirable physical properties of solid pesticide formulation which are based on clay carriers.

One of the clay materials that has been found to be especially suitable as a carrier for organic pesticides is attapulgite clay. The attapulgite clay that is employed as the toxicant carrier material is calcined at product temperature of 600° F. to 1000° F. to a V.M. of about 7% to 15% before being impregnated with the toxicant. The calcined attapulgite clays, as exemplified by the clays commercially supplied under the trade name of "Attaclay," have been considered to possess excellent physical properties as carrier material for organic toxicants and, virtually without exception, all of the attapulgite clay that is used by the industry as a carrier for toxicants is clay that has been previously moderately calcined at 600° F. to 1000° F., as described above.

Although the Attaclays possess excellent flow properties after impregnation with organic toxicants and are readily amenable to impregnation with organic toxicants, the calcined clay unfortunately tends to cause certain types of toxicants, such as thiophosphate ester toxicants, to decompose chemically and to lose their potency when the solid toxicant compositions are stored for long periods in temperate climates or for shorter periods in the tropics. One such toxicant that is unstable and loses potency when carried on commercial grades of calcined attapulgite clay is O,O-diethyl-O(2-isopropyl-4-methyl-pyrimidyl 6) thiophosphate (Diazinon). This toxicant, which is employed extensively to combat western corn rootworm, an insect which has become resistant to other insecticides, cannot be formulated with calcined attapulgite clay or other mineral products used by the industry as a toxicant carrier unless the formulation is used almost imemdiately after it has been prepared. Surface treatment of Attaclay with chemicals, such as certain fatty acids, which have been found to be extremely effective in stabilizing the clay against catalytic decomposition of other thiophosphate ester toxicants, is of little value or no value in stabilizing Diazinon-Attaclay solid formulations. Therefore, solid Diazinon formulations, such as granules or pellets intended for aerial distribution to combat corn rootworm, are presently formulated with a nut-shell carrier. This carrier material is extremely expensive as compared with mineral carrier materials such as clays.

Accordingly, an object of this invention is the provision of stable solid, free-flowing toxicant compositions containing an attapulgite clay carrier.

A more specific object is the provision of storage-stable Diazonin formulations containing a clay carrier which is considerably cheaper than the nonmineral carrier presently used with Diazinon.

Further objects and advantages will be readily apparent to those skilled in the art.

This invention is a result of my discovery that the normal tendency of attapulgite clay to decompose an organic toxicant in contact therewith can be significantly reduced by subjecting the clay to a thermal treatment, hereinafter set forth, before the clay is formulated with the toxicant.

Stated briefly, the storage-stable solid pesticidal compositions of this invention comprise an organic toxicant which normally decomposes rapidly when stored in direct contact with attapulgite clay, especially a thiophosphate ester toxicant such as Diazonin, the toxicant being in direct contact with particles of attapulgite clay, the crystalline structure of which has been previously altered by calcining the clay at a temperature and for a time sufficient to eliminate substantially all volatile matter therefrom, the temperature and time being selected to reduce the surface area of the clay to a value within the range of 1 to 20 square meters per gram, and preferably within the range of 5 to 15 square meters per gram.

Thus, it can be seen that it is of the essence of this invention to utilize as the clay carrier a material which is derived from attapulgite clay, a clay which differs chemically and in its physical nature from other clays such as kaolins and bentonite.

It is also an essence of this invention to use attapulgite clay which has been calcined under conditions that suffice to remove all of the water of crystallization from the clay and yet are so controlled that the surface area of the calcined clay material is reduced. It has been found, surprisingly, that the mere removal of substantially all of the water of crystallization and free moisture from attapulgite clay without a reduction in surface area will not produce the desired results. The stability of a toxicant impregnated on such clay will not differ markedly from the stability of the toxicant impregnated on commercial calcined attapulgite clay which contains some chemically bonded water.

Unexpectedly, the thermally treated clay can be satisfactorily formulated with adequate quantities of organic toxicant material without a loss of free-flowing properties which, if the loss occurred, would prevent satisfactory mechanical distribution of the toxicant formulation.

After being stored, solid toxicant formulations of this invention will retain a significantly higher level of potency than comparable toxicant formulations based on the grades of attapulgite clay that have been employed heretofore in the production of solid pesticide formulations. Thus, for example, only a small percentage of the Diazonin, formulated in accordance with this invention, will decompose when the solid composition is stored for several months, in contrast with a comparable prior art Diazinon formulation based on commercial calcined attapulgite clay carrier material in which a major portion of the Diazinon decomposes with a comparable loss in pesticidal activity.

The above-mentioned benefits can be obtained at a cost which is considerably less than the cost involved in using a nutshell carrier or the cost entailed in using clays with typical chemical deactivating agents.

To produce the clay carrier utilized in formulating the improved pesticidal compositions of this invention, the clay is calcined at a product temperature in excess of about 1500° F. and below about 2000° F., typically at a product temperature within the range of about 1600° F. to about 1850° F., for a time sufficient to reduce the V.M. to about zero and surface area to a value of 1 to to 20 square meters per gram, preferably to a value within the range of 5 to 15 square meters per gram. Attapulgite clay that has been calcined to a V.M. of about zero and a surface area less than about 5 square meters per gram will not be capable of being impregnated with the quantities of toxicant which can be employed successfully with attapulgite clay which has a V.M. of about zero and a surface area within the preferred range. On the other hand, toxicant formulations based upon an attapulgite clay toxicant carrier that has been calcined to a V.M. of about zero and has a surface area in excess of about 20 square meters per gram may not possess the storage stability of the formulation based on the attapulgite calcined to a lower surface area value.

When the clay is calcined at a temperature below about 1500° F., the time required to reduce the clay V.M. and surface area to the required value will be prohibitive when conventional calcination equipment is used. On the other hand, when the calcination is carried out at product temperatures in excess of about 2000° F., difficulty may be experienced in restricting the surface area of the calcined clay material to a suitable value.

The time required for the calcination will vary with calcination temperature and the nature of the calcination equipment used. In most equipment, calcination time will be within the range of ½ hour to 12 hours. Calcination can be carried out in a muffle furnace, rotary calciner or other suitable equipment.

The clay is crushed before the calcination, and screened and sized after calcination to provide particles of the desired size. The particles may be fairly coarse aggregates, such as particles 10/20 mesh, finer granules such as particles 30/60 mesh or powder (e.g., minus 325 mesh), depending upon whether the toxicant composition is formulated as a granular product, wettable powder or dust.

Preferably, the attapulgite clay is calcined by a two-stage calcination. By this means a more uniform product can be obtained than when a single-stage calcination is used. In putting this form of the invention into practice, the clay (in the form of granules or extruded pellets) is initially calcined at a moderate temperature such as is employed in producing commercial grades of attapulgite clay for agricultural use, e.g., at 600° F. to 1000° F. The clay is calcined to a V.M. of say 7% to 15%, ground to particles of the desired mesh size and screened. The calcined particles are then further calcined at a temperature in excess of 1500° F. to a V.M. of about zero and to a satisfactory surface area level, above-described.

As brought out above, this invention is especially applicable to the stabilization of attapulgite clay based thiophosphate ester toxicants. These toxicants, which contain a P—S—C linkage, generally tend to be decomposed catalytically when in contact with commercially available forms of attapulgite clay. This invention is of especial importance in its application to Diazinon, a thiophosphate ester toxicant which, prior to this invention, could not be formulated successfully with a siliceous mineral carrier.

Diazinon is a colorless liquid which is readily soluble in petroleum solvents such as alcohol and xylene and these solvents can be employed to facilitate impregnation of the clay with the Diazinon. Solid Diazinon formulations of this invention can be produced by impregnation techniques well known to those skilled in the art to obtain granular products, wettable powders or dusts. In producing granular products, a 10% Diazinon concentration will be suitable although lower or somewhat higher concentrations of toxicant can be employed. Typical Diazinon content of dust concentrates and wettable powders will be about 15% to 25%. As in the production of other solid toxicant compositions, chemicals can be employed with the Diazinon, either mixed with the Diazinon or coated on the thermally decomposed attapulgite clay before impregnation with the Diazinon, to stabilize further the Diazinon.

The following example is given to illustrate the advantage of a granular toxicant formulation of this invention over a prior art granular toxicant formulation.

Control Diazinon granules containing 10% Diazinon were obtained by impregnating 15/30 mesh commercial attapulgite clay granules that had been obtained by calcining attapulgite clay to a V.M. of 14% and a F.M. of 5% at about 500° F. to 600° F. (Attaclay AA RVM). The surface area of the Attaclay was about 125 square meters per gram.

A second control sample containing 10% Diazinon was formulated with 15/30 mesh commercial attapulgite clay granules that had been obtained by calcining attapulgite clay at about 1000° F. to a V.M. of 7.0% and a F.M. of 0.2% (Attaclay AA LVM).

In accordance with this invention, 10% Diazinon was impregnated on 15/30 mesh granules that had been produced by further calcining the Attaclay AA RVM in a rotary kiln with a gas inlet temperature of 2000° F. (product temperature of about 1600° F.). The V.M. and F.M. of the calcined material were 0% (as produced) and the surface area was 11.8 square meters per gram.

To determine whether the mere removal of all free moisture and virtually all chemically combined water from the attapulgite would stabilize the Diazinon impregnated clay against decomposition, a sample of the Attaclay AA RVM was calcined in a rotary kiln with a gas inlet temperature of 1750° F. (product temperature about 1350° F.) to a V.M. of 0.84% and a surface area of 100 square meters per gram. The clay was then impregnated with 10% Diazinon.

Samples of each toxicant formulation were subjected to an accelerated storage stability test at 70° C. to determine the time required for the sample to undergo a 10% loss of active ingredient. By correlating stability data of the test samples at elevated temperature with data for commercial formulations at both elevated temperature and under normal storage conditions, the commercial life expectancy of the test sample under normal storage conditions is predicted.

With the commercial Attaclays, a 10% loss of toxicant was reached in less than an hour. With the attapulgite clay carrier calcined to a V.M. of 0.84% and a surface area of 100 square meters per gram, the 10% loss point was reached in about 21 hours. With the attapulgite clay carrier calcined to a V.M. of 0% and a surface area of 11.8 square meters per gram, in accordance with this invention, the 10% loss point was reached in 3.7 days, from which experience indicates that the sample would be expected to have satisfactory stability under normal storage conditions for close to a year.

Similar results were realized with a 50° C. accelerated storage stability test. After exposure at 50° C. for one month, the loss of active ingredient was only about 7% for the formulation made up with the 11.8 square meter per gram calcined attapulgite. In contrast, the loss was 72% for the formulation made with the 100 square meter per gram calcined attapulgite and 95% for the Diazinon formulated with Attaclay.

The term "volatile matter" or "V.M.," as used herein, refers to the weight percentage of a material that is eliminated when the material is heated to constant weight at 1800° F. "Free moisture" or "F.M.," refers to the weight percentage of a material that is eliminated when the material is heated to constant weight at 225° F. In the case of attapulgite clay, per se, water accounts for substantially all of the volatile matter and free moisture. All surface area values referred to herein are values obtained by the low temperature nitrogen adsorption method of Brunauer, Emmett and Teller, described in J. Am. Chem. Soc., 60, 309 (1938), using the molecular size data of Livingston (J. Am. Chem. Soc., 66, 569 (1944)) and the apparatus described by Krieger in Ind. Eng. Chem., Anal. Ed. 16, 25 (1944). All mesh sizes refer to values obtained with Tyler screen size sieves.

I claim:

1. A pesticidal composition comprising an organic thiophosphate ester toxicant which normally decomposes during storage when in direct contact with attapulgite clay and an attapulgite clay carrier therefor, said attapulgite clay having been previously calcined at a temperature and for a time sufficient to eliminate substantially all volatile matter therefrom, said time and temperature being such as to reduce the surface area of said attapulgite clay to a value within the range of 1 to 20 square meters per gram, whereby said toxicant has a reduced tendency to decompose during storage when in contact with the attapulgite clay.

2. A pesticidal composition comprising O,O-diethyl-O (2-isopropyl-4-methyl-pyrimidyl 6) thiophosphate which normally decomposes during storage when in direct contact with attapulgite clay and an attapulgite clay carrier therefor, said attapulgite clay having been previously calcined at a temperature and for a time sufficient to eliminate substantially all volatile matter therefrom, said time and temperature being such as to reduce the surface area of said attapulgite clay to a value within the range of 1 to 20 square meters per gram, whereby said O,O-diethyl-O (2-isopropyl-4-methyl-pyrimidyl 6) thiophosphate has a reduced tendency to decompose during storage when in contact with the attapulgite clay.

3. A pesticidal composition comprising O,O-diethyl-O (2-isopropyl-4-methyl-pyrimidyl 6) thiophosphate which normally decomposes during storage when in direct contact with attapulgite clay and an attapulgite clay carrier therefor, said attapulgite clay having been previously calcined at a temperature in excess of 1500° F. and for a time sufficient to eliminate substantially all volatile matter therefrom, said time and temperature being such as to reduce the surface area of said attapulgite clay to a value within the range of 1 to 20 square meters per gram, whereby said O,O-diethyl-O (2-isopropyl-4-methyl - pyrimidyl 6) thiophosphate has a reduced tendency to decompose during storage when in contact with the attapulgite clay.

4. A pesticidal composition comprising O,O-diethyl-O (2-isopropyl-4-methyl-pyrimidyl 6) thiophosphate which normally decomposes during storage when in direct contact with attapulgite clay and an attapulgite clay carrier therefor, said attapulgite clay having been previously calcined at a temperature in excess of 1500° F. and for a time sufficient to eliminate substantially all volatile matter therefrom, said time and temperature being such as to reduce the surface area of said attapulgite clay to a value within the range of 5 to 15 square meters per gram, whereby said O,O-diethyl-O (2-isopropyl-4-methyl - pyrimidyl 6) thiophosphate has a reduced tendency to decompose during storage when in contact with the attapulgite clay.

5. A pesticidal composition consisting essentially of O,O-diethyl-O (2-isopropyl-4-methyl-pyrimidyl 6) thiophosphate which normally decomposes during storage when in direct contact with attapulgite clay and an attapulgite clay carrier therefor, said attapulgite clay having been previously calcined at a temperature in excess of 1500° F. and for a time sufficient to eliminate substantially all volatile matter therefrom, said time and temperature being such as to reduce the surface area of said attapulgite clay to a value within the range of 5 to 15 square meters per gram, whereby said O,O-diethyl-O (2-isopropyl-4-methyl-pyrimidyl 6) thiophosphate has a reduced tendency to decompose during storage when in direct contact with the attapulgite clay.

6. Particles of attapulgite clay having O,O-diethyl-O (2-isopropyl-4-methyl - pyrimidyl 6) thiophosphate impregnated thereon, said attapulgite clay having been produced by calcining attapulgite clay at a temperature in excess of 1500° F. for a time sufficient to eliminate substantially all volatile matter therefrom, said temperature and said time being selected to reduce the surface area of the clay to a value within the range of 5 to 15 square meters per gram.

References Cited by the Examiner

UNITED STATES PATENTS

| | | | |
|---|---|---|---|
| 2,279,405 | 4/1942 | Laughlin | 167—42 |
| 2,754,243 | 7/1956 | Gysin et al. | 167—33 |
| 2,967,127 | 1/1961 | Sawyer et al. | 167—42 |
| 3,062,637 | 11/1962 | Marples et al. | 167—42 |
| 3,062,709 | 11/1962 | Ordas | 167—42 |

OTHER REFERENCES

Attaclay Pesticide Digest (II), volume I, No. 5, 4 page pamphlet published by the Attapulgus Mineral and Chemical Corp., 210 West Washington Square, Philadelphia 5, Pa.

Industrial and Engineering Chemistry, vol. 42 (1950), p. 529.

Journal of Agr. and Food Chem., vol. 8, No. 3, May-June 1960, pp. 203–9.

Journal of Economic Entomology, volume 41, No. 5, August 1948, page VIII.

JULIAN S. LEVITT, *Primary Examiner.*